US012800462B2

(12) United States Patent
Ohyang et al.

(10) Patent No.: US 12,800,462 B2
(45) Date of Patent: Nov. 17, 2026

(54) METHOD FOR SCREENING AND DETECTING BIOLOGICAL PARTICLES

(71) Applicant: LiqBio biomedical company limited, New Taipei City (TW)

(72) Inventors: Chi-Kun Ohyang, Taoyuan City (TW); Tzu-Keng Chiu, New Taipei City (TW); Yu-Xian Zhu, Hsinchu County (TW)

(73) Assignee: LiqBio biomedical company limited, New Taipei City (TW)

( * ) Notice: Subject to any disclaimer, the term of this patent is extended or adjusted under 35 U.S.C. 154(b) by 44 days.

(21) Appl. No.: 19/091,817

(22) Filed: Mar. 27, 2025

(65) Prior Publication Data

US 2026/0194435 A1 Jul. 9, 2026

(30) Foreign Application Priority Data

Jan. 3, 2025 (TW) ................................ 114100237

(51) Int. Cl.
*G01N 15/01* (2024.01)
*G01N 1/38* (2006.01)
*G01N 15/14* (2024.01)

(52) U.S. Cl.
CPC ............... *G01N 15/01* (2024.01); *G01N 1/38* (2013.01); *G01N 15/14* (2013.01)

(58) Field of Classification Search
CPC ........... G01N 15/01; G01N 1/38; G01N 15/14
USPC ........................................................... 356/39
See application file for complete search history.

(56) References Cited

U.S. PATENT DOCUMENTS

2021/0248430 A1* 8/2021 Kuwamori ........... G06N 3/0464
2022/0136954 A1 5/2022 Vazirani et al.
2022/0364963 A1 11/2022 Baston et al.

FOREIGN PATENT DOCUMENTS

EP 4079404 A1 10/2022

OTHER PUBLICATIONS

Search Report for EP25169648, Issued on Sep. 17, 2025, Total of 2 pages.

* cited by examiner

*Primary Examiner* — Md M Rahman
(74) *Attorney, Agent, or Firm* — Apex Juris, pllc; Hilde M. L. Coeckx

(57) ABSTRACT

A method for screening and detecting biological particles includes: providing a system for screening and detecting biological particles which includes a channel, an optical detecting assembly, and a carrier, wherein the optical detecting assembly is provided with a detecting light path penetrating through the channel and is for detecting a target biological particle; providing a sample; diluting the sample to form a detected solution; controlling the detected solution to pass through an entrance end of the channel; and controlling the carrier to move to an exit end of the channel when the target biological particle in the detected solution, wherein a diluent is provided in the carrier; controlling a portion of the detected solution, which includes the target biological particle, to pass through the exit end and to be received by the carrier to dilute the portion of the detected solution.

9 Claims, 2 Drawing Sheets

METHOD FOR SCREENING AND DETECTING BIOLOGICAL PARTICLES

BACKGROUND OF THE INVENTION

Technical Field

The present invention relates generally to biochemical detecting system, and more particularly to a method for screening and detecting biological particles.

Description of Related Art

A convention biochemical detecting way is to manually perform detection methods, such as fluorescent staining procedure and immunoprecipitation procedure, on a biological sample for detection. However, the conventional biological detecting way is limited by a lot of factors, such as tools used by an operator and skills of the operator, so that a large sample volume (such as blood, other body fluids, hairs, nails, etc.) is needed. Therefore, microdetection is hard to be performed manually.

Apart from the difficulty of performing the microdetection manually, when the number of biological particles in the biological sample is large, the difficulty of identifying or screening a target biological particle is increased and the accuracy of identifying or screening the target biological particle is decreased. Therefore, how to provide a method for screening and detecting biological particles that could be used in microdetection and could improve the accuracy of identifying and screening the target biological particle, is a problem needed to be solved in the industry.

BRIEF SUMMARY OF THE INVENTION

In view of the above, the primary objective of the present invention is to provide a method for screening and detecting biological particles, which could be used in microdetection and could improve the accuracy of identifying and screening a target biological particle.

The present invention provides a method for screening and detecting biological particles, including:

- providing a system for screening and detecting biological particles, wherein the system for screening and detecting biological particles includes a channel, an optical detecting assembly, and a carrier; the optical detecting assembly is provided with a detecting light path; the detecting light path penetrates through the channel; the optical detecting assembly is configured to detect a target biological particle;
- providing a sample;
- diluting the sample to form a detected solution;
- controlling the detected solution to pass through an entrance end of the channel; and
- controlling the carrier to move to an exit end of the channel when the target biological particle in the detected solution is detected by the optical detecting assembly, wherein a diluent is provided in the carrier; controlling a portion of the detected solution, which includes the target biological particle to pass through the exit end and to be received by the carrier to dilute the portion of the detected solution.

With the aforementioned design, through the method for screening and detecting biological particles, microdetection could be performed. Through diluting the sample to form the detected solution, when a number of biological particles in the sample is large, the aggregation of biological particles and the high concentration of the sample could be prevented, which influence the accuracy of the optical detecting assembly detecting the target biological particle. In this way, the accuracy and the stability of the microdetection could be improved.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
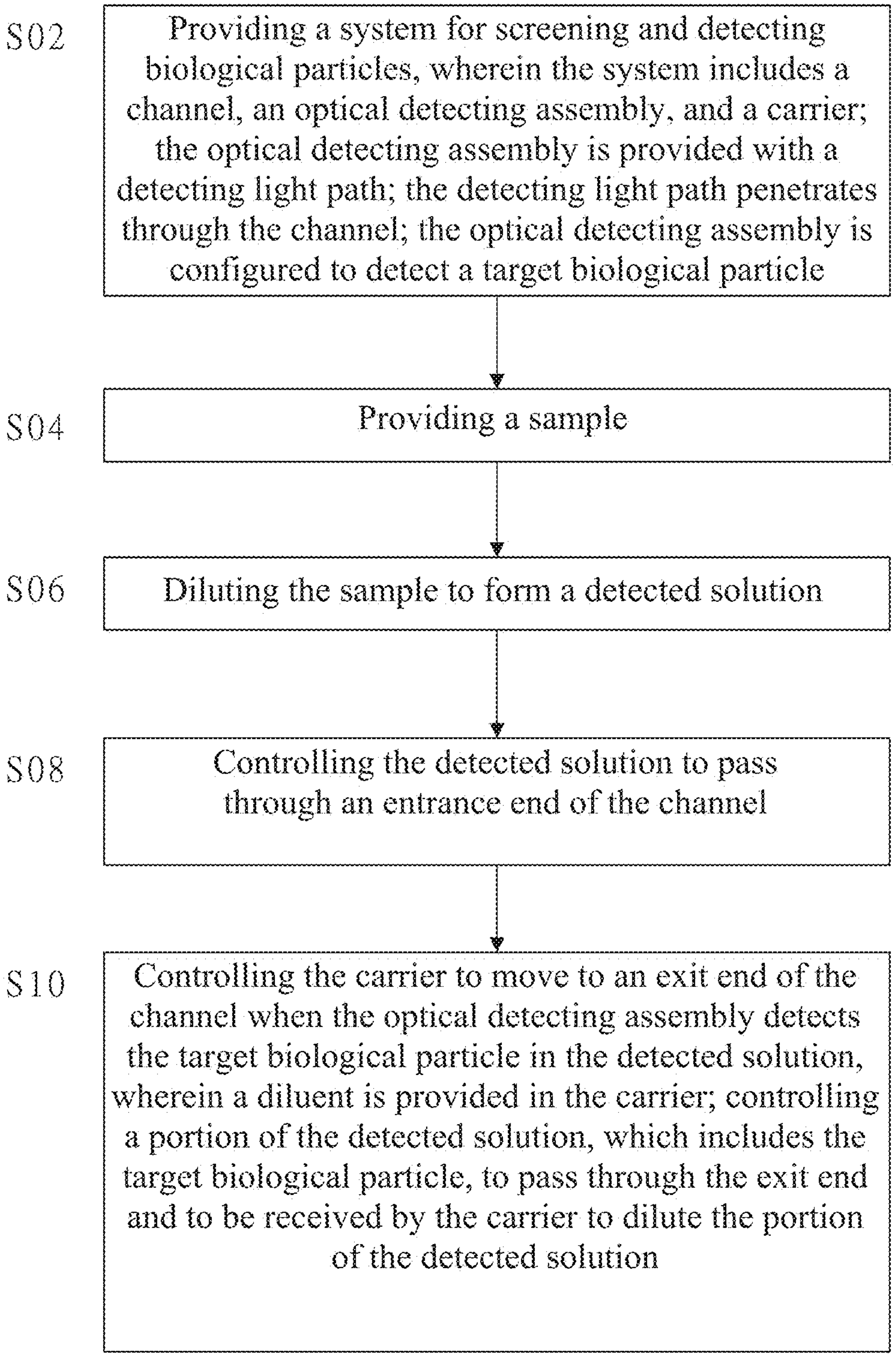
FIG. 1 is a flowchart of the method for screening and detecting biological particles according to an embodiment of the present invention.
Figure 2:
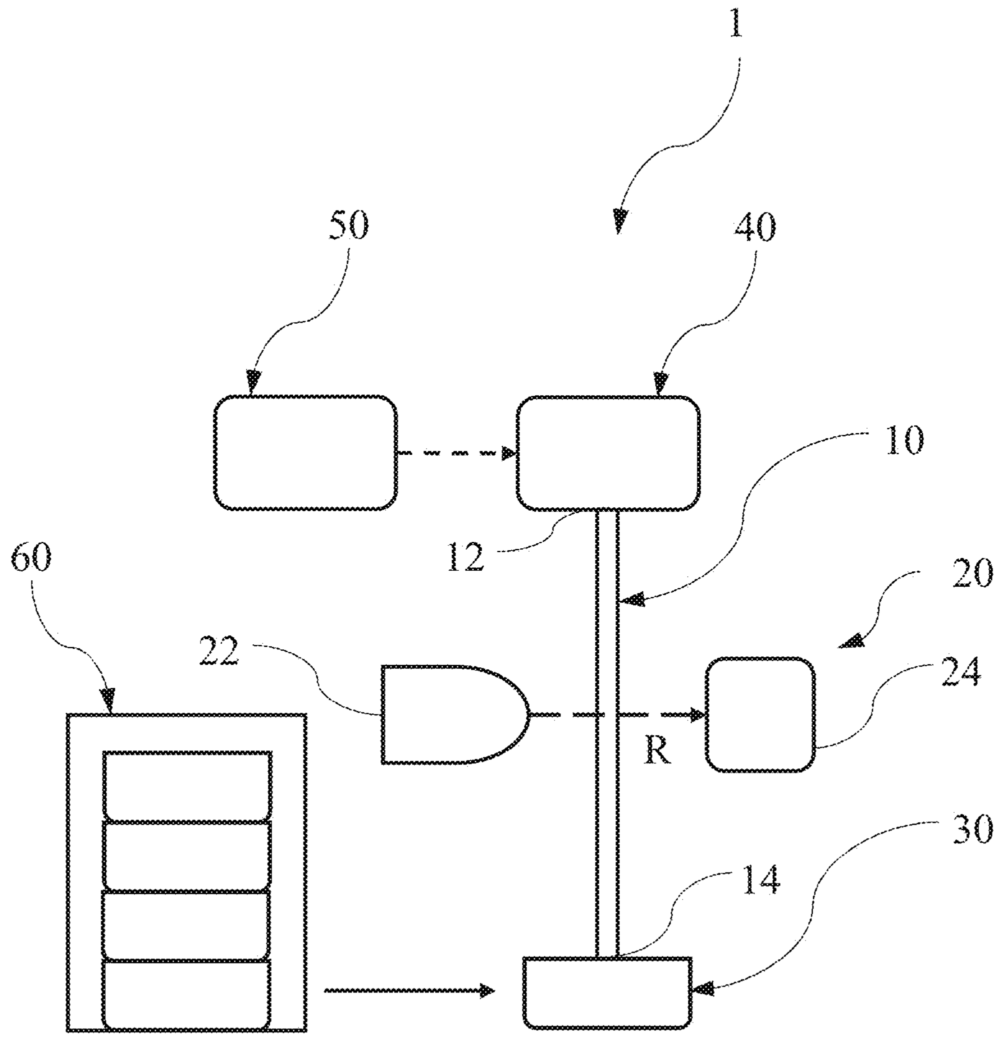
FIG. 2 is a block diagram of the system for screening and detecting biological particles according to the embodiment of the present invention.

A flowchart of a method for screening and detecting biological particles according to an embodiment of the present invention is illustrated in FIG. 1. The method for screening and detecting biological particles includes the following steps:

Step S02: providing a system 1 for screening and detecting biological particles, wherein the system 1 for screening and detecting biological particles includes a channel 10, an optical detecting assembly 20, and a carrier 30; the optical detecting assembly 20 is provided with a detecting light path R; the detecting light path R penetrates through the channel 10; the optical detecting assembly 20 is configured to detect a target biological particle. In the current embodiment, the method for screening and detecting biological particles is performed by the system 1 for screening and detecting biological particles 1 shown in FIG. 2 as an example. In other embodiments, the method for screening and detecting biological particles could be performed by other systems for screening and detecting biological particles.

Step S04: providing a sample. The sample could be a blood sample, a urine sample, a pleural effusion sample, a peritoneal fluid sample, a spinal fluid sample, a cerebrospinal fluid sample, or an amniotic fluid sample.

Step S06: diluting the sample to form a detected solution. In the current embodiment, the method for screening and detecting biological particles further includes mixing the detected solution thoroughly, so that biological particles are evenly distributed. More specifically, Step S06 includes diluting the sample 5× to 100×. In an embodiment, when the blood sample is 8 ml, 32 ml of a diluent is added to dilute the sample 5×. In another embodiment, when the blood sample is 4 ml, 36 ml of the diluent is added to dilute the sample 10×. In still another embodiment, when the blood sample is 1 ml, 39 ml of the diluent is added to dilute the sample 40×. In still another embodiment, when the blood sample is 1 ml, 99 ml of the diluent is added to dilute the sample 100×. By diluting the sample 5× to 100×, a concentration of the blood sample could be prevented from being too high, which influences the difficulty of subsequently capturing biological particles; the concentration of the blood sample could be prevented from being too low, which lengthens the time required for subsequently screening and detecting biological particles.

Moreover, the diluent is a buffer for maintaining a pH value of the sample or cell culture medium for incubating cells, such as Tris buffer, Phosphate buffer, HEPES buffer, MES buffer, MOPS buffer, minimal essential medium (MEM), alpha minimal essential medium (α-MEM), Dulbecco's modified minimal essential medium (DMEM), F-12 Medium (Ham's F-12) Dulbecco's Modified Eagle's Medium/Ham's F-12 (DMEM/F12), RPMI 1640, M-199, etc. In order to maintain the cell viability of the biological particles, the diluent includes a serum with a concentration between 1% and 25%. Preferably, the concentration of the serum is between 2% and 10%. The serum added could be Fetal Bovine Serum (FBS), Bovine Calf Serum (CS), Horse Serum, Human serum, etc. In order to prevent the biological particles from attaching to the channel 10 or the carrier 30, the diluent includes an anticoagulant. The anticoagulant added could be ethylenediaminetetraacetic acid (EDTA), Heparin, Sodium Citrate, Potassium oxalate, or K2EDTA. A pH value and an osmolality of the diluent are identical to the pH value and an osmolality of the sample to be detected, so that the configuration and the status of the biological particles remain stable during detecting. The diluent for diluting the blood sample has the pH value typically ranging from pH6.5 to pH8.0. Preferably, the pH value of the diluent ranges from pH7.0 to pH7.5. The diluent has the osmolality ranging from 200 mOsm/kg to 400 mOsm/kg. Preferably, the osmolality of the diluent ranges from 250 mOsm/kg to 350 mOsm/kg. Moreover, the diluent is a transparent solution, so that the detecting light path R of the optical detecting assembly 20 could penetrate through the channel 10 and the diluted detected solution for detecting the target biological particle.

Step S08: controlling the detected solution to pass through an entrance end 12 of the channel 10. In the current embodiment, the channel 10 is a microfluidic channel. The entrance end 12 of the channel 10 communicates with a sample reservoir 40. Another end of the channel 10 is configured to discharge the detected solution. More specifically, a sample loading apparatus 50 is controllable to regulate an amount of the detected solution in the sample reservoir 40 entering the channel 10, thereby controlling the detected solution to be discharged from the channel 10 or to remain stationary and controlling a flowing speed of the detected solution in the channel 10.

Step S10: controlling the carrier 30 to move to an exit end 14 of the channel 1 when the target biological particle in the detected solution is detected by the optical detecting assembly 20, so that the target biological particle is received by the carrier 30 after being discharged from the exit end 14, wherein the optical detecting assembly 20 includes an excitation light source 22 and an optical detector 24; a light emitted by the excitation light source 22 penetrates through the channel 10 along the detecting light path R and then is received by the optical detector 24; in the current embodiment, the excitation light source 22 and the optical detector 24 of the optical detecting assembly 20 are respectively located on two opposite sides of the channel 10; in another embodiment, the excitation light source 22 and the optical detector 24 of the optical detecting assembly 20 could be located on an identical side of the channel 10; the optical detecting assembly 20 is provided with a detecting light path R; the detecting light path R is projected on the target biological particle in the channel 10 and then the optical detecting assembly 20 detects the target biological particle; when the target biological particle in the detected solution is detected by the optical detecting assembly 20, the sample loading apparatus 50 controls the sample reservoir 40 to stop supplying the detected solution to the channel 10, so that the detected solution located in the channel 10 is controlled to stop flowing and the channel 10 is stopped from discharging the detected solution; when the carrier 30 is controlled to move to the exit end 14 of the channel 10, the detected solution located in the channel 10 is controlled to flow, so that a portion of the detected solution, which includes the target biological particle, is discharged from the exit end 14 to be received by the carrier 30; afterwards, the carrier 30 receiving the target biological particle could be moved to, for example, a capturing device for subsequently performing a process of capturing the target biological particle; Step S08 and Step S10 could be repeatedly performed to continuously detect the target biological particle in the detected solution; in the current embodiment, the carrier 30 is controlled by a carrier unit 60 to move to the exit end 14 of the channel 10; in the current embodiment, a volume of the portion of the detected solution being discharged to the carrier 30 is between 5 μl and 40 μl, wherein the volume of the portion of the detected solution being discharged to the carrier 30 could be 5 ul, 10 ul, 15 ul, 20 ul, 25 ul, 30 ul, 35 ul, or 40 ul according to the need of an operator; in other embodiments, the volume of the portion of the detected solution being discharged to the carrier 30 could be adjusted according to the need of the operator.

Additionally, the excitation light source 22 could be a laser light source, a mercury lamp, or a LED lamp. A wavelength of the light emitted by the excitation light source 22 could be a visible light or an invisible light. The optical detector 24 could be a photomultiplier tube (PMT) or a charge-coupled device (CCD). Preferably, the optical detecting assembly 20 further includes a light filter disposed on a front end of the optical detector 24. A number of the light filter could be one or plural.

For example, an excitation light of emitted by the excitation light source 22 could enter the channel 10 along the detecting light path R. After the target biological particle in the channel 10 absorbs the excitation light emitted by the excitation light source 22, the target biological particle emits an emission light. The emission light could be a fluorescent light or a luminescent light. After filtering by the light filter, a wavelength of the emission light emitted due to excitation could pass through the light filter to enter the optical detector 24, so that the optical detecting assembly 20 could detect the target biological particle.

In the current embodiment, Step S10 further includes receiving a diluent into the carrier 30 and controlling the portion of the detected solution, which includes the target biological particle, to pass through the exit end 14 and then to be received by the carrier 30 to dilute the portion of the detected solution. In other words, when the portion of the detected solution, which includes the target biological particle, is discharged from the exit end 14 to the carrier 30 receiving the diluent, the dilution could be simultaneously completed, thereby facilitating the subsequent process of capturing of the target biological particle. The diluent could dilute the portion of the detected solution, so that the sample is diluted 50× to 10000×.

Preferably, the diluent dilutes the portion of the detected solution, so that the portion of the detected solution is diluted 10× to 100×. Preferably, the portion of the detected solution is diluted 20× to 60×. In the current embodiment, the portion of the detected solution is between 5 μl and 40 μl. In an embodiment, the portion of the detected solution is 5 μl, and the diluent in the carrier 30 is 495 μl, so that the portion of the detected solution is diluted 100×. In another embodiment, the portion of the detected solution is 10 μl, and the diluent in the carrier 30 is 490 μl, so that the diluent dilutes the portion of the detected solution 50×. In still another embodiment, the portion of the detected solution is 15 μl, and the diluent in the carrier 30 is 525 μl, so that the portion of the detected solution is diluted 36×. In still another embodiment, the portion of the detected solution is 20 μl, and the diluent of the carrier 30 is 500 μl, so that the portion of the detected solution is diluted 26×. In still another embodiment, the portion of the detected solution is 25 μl, and the diluent of the carrier 30 is 500 μl, so that the portion of the detected solution is diluted 21×. In still another embodiment, the portion of the detected solution is 30 μl, and the diluent of the carrier 30 is 570 μl, so that the portion of the detected solution is diluted 20×. In still another embodiment, the portion of the detected solution is 35 μl, and the diluent of the carrier 30 is 490 μl, so that the portion of the detected solution is diluted 15×. In still another embodiment, the portion of the detected solution is 40 μl, and the diluent in the carrier 30 is 360 μl, so that the portion of the detected solution is diluted 10×.

Moreover, in the current embodiment, Step S06 includes diluting the sample 5× to 100×. In other embodiments, a lower limit of diluting the sample is 5×, 10×, or 15× and an upper limit of diluting the sample is 100×, 90×, or 80×. In the current embodiment, Step S10 includes diluting the portion of the detected solution 10× to 100×. In other embodiments, a lower limit of diluting the portion of the detected solution is 10×, 15×, or 20× and an upper limit of diluting the portion of the detected solution is 100×, 80×, or 60×. A lower limit of a total dilution ratio is the lower limit of diluting the sample multiplied by the lower limit of diluting the portion of the detected solution. An upper limit of the total dilution ratio is the upper limit of diluting the sample multiplied by the upper limit of diluting the portion of the detected solution.

In summary, through the method for screening and detecting biological particles of the present invention, microdetection could be performed. Through diluting the sample to form the detected solution, when a number of biological particles in the sample is large, the aggregation of biological particles and the high concentration of the sample could be prevented, which influence the accuracy of the optical detecting assembly 20 in detecting the target biological particle in the detected solution. In this way, the accuracy and the stability of the microdetection could be improved.

It must be pointed out that the embodiment described above is only a preferred embodiment of the present invention. All equivalent methods and structures which employ the concepts disclosed in this specification and the appended claims should fall within the scope of the present invention.

What is claimed is:

1. A method for screening and detecting biological particles, comprising:

providing a system for screening and detecting biological particles, wherein the system for screening and detecting biological particles comprises a channel, an optical detecting assembly, and a carrier; the optical detecting assembly is provided with a detecting light path;

the detecting light path penetrates through the channel; the optical detecting assembly is configured to detect a target biological particle;

providing a sample;

diluting the sample to form a detected solution;

controlling the detected solution to pass through an entrance end of the channel; and controlling the carrier to move to an exit end of the channel when the target biological particle in the detected solution is detected by the optical detecting assembly, wherein a diluent is provided in the carrier; controlling a portion of the detected solution, which comprises the target biological particle, to pass through the exit end and to be received by the carrier to dilute the portion of the detected solution.

2. The method as claimed in claim 1, further comprising diluting the sample 5× to 100×.

3. The method as claimed in claim 1, further comprising mixing the detected solution thoroughly, so that biological particles in the detected solution are evenly distributed after diluting.

4. The method as claimed in claim 3, wherein the portion of the detected solution is diluted, so that the sample is diluted 50× to 10000×.

5. The method as claimed in claim 3, wherein the diluent dilutes the portion of the detected solution, so that the portion of the detected solution is diluted 10× to 100×.

6. The method as claimed in claim 3, wherein the diluent dilutes the portion of the detected solution, so that the portion of the detected solution is diluted 20× to 60×.

7. The method as claimed in claim 1, wherein the sample is a blood sample, a urine sample, a pleural effusion sample, a peritoneal fluid sample, a spinal fluid sample, a cerebrospinal fluid sample, or an amniotic fluid sample.

8. The method as claimed in claim 1, wherein when the target biological particle in the detected solution is detected by the optical detecting assembly, the detected solution is controlled to stop flowing in the channel; when the carrier is controlled to move to the exit end of the channel, the detected solution is controlled to flow in the channel, so that the portion of the detected solution, which comprises the target biological particle, passes through the exit end and then is received by the carrier.

9. The method as claimed in claim 1, wherein the optical detecting assembly comprises an excitation light source and an optical detector; a light emitted by the excitation light source penetrates through the channel along the detecting light path and then is received by the optical detector.

* * * * *